United States Patent
Jeong et al.

(10) Patent No.: US 11,436,064 B2
(45) Date of Patent: Sep. 6, 2022

(54) METHOD FOR IMPROVING PROCESSING SPEED OF INPUT AND OUTPUT RELATED TO WRITING IN OPERATING SYSTEM

(71) Applicants: Research & Business Foundation Sungkyunkwan University, Suwon-si (KR); High Performance Computing Research Center, Suwon-si (KR)

(72) Inventors: Jinkyu Jeong, Suwon-si (KR); Gyusun Lee, Suwon-si (KR)

(73) Assignees: Research & Business Foundation Sungkyunkwan University, Suwon-si (KR); HIGH PERFORMANCE COMPUTING RESEARCH CENTER, Suwon-si (KR)

( * ) Notice: Subject to any disclaimer, the term of this patent is extended or adjusted under 35 U.S.C. 154(b) by 0 days.

(21) Appl. No.: 17/186,154

(22) Filed: Feb. 26, 2021

(65) Prior Publication Data
US 2021/0263789 A1    Aug. 26, 2021

(30) Foreign Application Priority Data
Feb. 26, 2020   (KR) .................. 10-2020-0023816

(51) Int. Cl.
*G06F 3/01*       (2006.01)
*G06F 9/54*       (2006.01)
*G06F 9/48*       (2006.01)

(52) U.S. Cl.
CPC ............ *G06F 9/545* (2013.01); *G06F 9/4843* (2013.01)

(58) Field of Classification Search
CPC ............................. G06F 9/545; G06F 9/4843
See application file for complete search history.

(56) References Cited

U.S. PATENT DOCUMENTS 9,734,157 B1 *   8/2017   Brahma Raju ........... G06F 3/06
2007/0220309 A1   9/2007   Andre et al.
(Continued)

FOREIGN PATENT DOCUMENTS

JP    2008-217154 A    9/2008
JP    2009-64178 A     3/2009
(Continued)

OTHER PUBLICATIONS

Yongseok Son et al. "Optimizing I/O Operations in File Systems for Fast Storage Devices", IEEE Transactions on Computers, vol. 66, No. 6, Jun. 2017).. (Year: 2017).*
(Continued)

*Primary Examiner* — Andy Ho
*Assistant Examiner* — Abdou K Seye
(74) *Attorney, Agent, or Firm* — NSIP Law

(57) ABSTRACT

A processing method includes: performing an I/O preparation process and an I/O request for a data block in an application program thread; activating, by the application program thread, a journaling thread; waiting for completion of an I/O for the data block and a commit of the journaling thread; preparing an I/O for the journal block and requesting the I/O for the journal block during the waiting for the completion of the I/O for the data block and the commit of the journaling thread, in the journaling thread; preparing an I/O for a journal commit block, before waiting for completion of the I/O for the journal block after the requesting of the I/O for the journal block; after waiting for the completion of the I/O for the journal block, requesting the I/O for the journal commit block; and waiting for completion of the I/O for the journal commit block.

7 Claims, 8 Drawing Sheets

(56) References Cited

U.S. PATENT DOCUMENTS

| | | | | |
|---|---|---|---|---|
| 2008/0046667 | A1* | 2/2008 | Fachan | G06F 3/064 |
| | | | | 711/154 |
| 2012/0137299 | A1* | 5/2012 | Moyer | G06F 9/4881 |
| | | | | 718/102 |
| 2014/0297918 | A1* | 10/2014 | Lee | G06F 11/141 |
| | | | | 711/102 |
| 2016/0077972 | A1* | 3/2016 | Pease | G06F 12/0804 |
| | | | | 711/141 |

FOREIGN PATENT DOCUMENTS

| | | |
|---|---|---|
| JP | 2014-106715 A | 6/2014 |
| KR | 10-2016-0065121 A | 6/2016 |
| KR | 10-2016-0143453 A | 12/2016 |

OTHER PUBLICATIONS

Korean Office Action dated Feb. 17, 2021 in corresponding Korean Patent Application No. 10-2020-0023816 (6 pages in Korean).
Korean Patent Decision issued on Dec. 7, 2021 in corresponding Korean Patent Application No. 10-2020-0023816. (5 pages in Korean).

* cited by examiner

METHOD FOR IMPROVING PROCESSING SPEED OF INPUT AND OUTPUT RELATED TO WRITING IN OPERATING SYSTEM

CROSS-REFERENCE TO RELATED APPLICATIONS

This application claims the benefit under 35 U.S.C. § 119(a) of Korean Patent Application No. 10-2020-0023816 filed on Feb. 26, 2020 in the Korean Intellectual Property Office, the entire disclosure of which is incorporated herein by reference for all purposes.

BACKGROUND

1. Field

The following description relates to a method for improving a processing speed of input and output related to writing in an operating system. For example, the following description is related to a method for improving a processing speed of input and output related to a plurality of writing for guaranteeing a sequence of writing in an operating system. The method is capable of reducing an overall execution time during the input and output related to continuous writing by performing a preparation process for a next writing input and output operation before a previous writing input and output operation is completed in a continuous writing input and output process provided by the operating system.

2. Description of the Related Art

With the development of non-volatile memory technologies such as a flash memory and a phase change memory, an ultra-low latency solid state drive (SSD) that provides extremely low latency and high bandwidth I/O performance has been developed.

State-of-the-art non-volatile memory express (NVMe) SSDs, such as the latest Samsung Z-SSD, Intel Optane SSD, and Toshiba XLFlash, provide I/O latency of less than 10 microseconds and I/O bandwidth of 3.0 GB/s.

Upon using such ultra-low latency SSDs, the operating system I/O stack occupies a significant portion of the total I/O latency, and, thus, the operating system I/O stack becomes a bottleneck for storage access. One way to mitigate an I/O stack overhead is to allow a user process to directly access a storage device. This approach is effective in removing an I/O stack overhead, but has a problem that puts a lot of burden on an application program.

For example, an application should have its own block management layer or a file system to build useful I/O primitives on top of a simple block-level interface (for example, SPDK's BlobFS). There is a problem in that it is difficult to provide protection functions to various application programs or users. This problem has another problem that limits the applicability of direct access to the storage device at a user level.

Traditionally, the operating systems provide file abstraction to storage management and application programs. There are many proposals to reduce an I/O stack overhead to make an operating system more suitable for high-speed storage devices. Some examples include using polling to eliminate a contextual switching overhead, removing a bottom half from interrupt processing, distributed/distributed I/O instructions, a simple block I/O scheduling layer, and the like.

These proposals are effective in reducing the I/O stack overhead, and some of these proposals have been adopted by mainstream operating systems (for example, I/O stack for NVMe SSDs in Linux). However, there is a need for a new method to optimize I/O latency in a storage access.

Implementing a current I/O stack requires a lot of work to process a single I/O request. For example, when an application program issues a read I/O request, a page is allocated, a page cache is indexed, DMA mapping is created for the page, and various auxiliary data structures (for example, bio, request, and iod in Linux) are allocated and manipulated.

Implementing the current I/O stack requires a lot of work to process a single I/O request. For example, when the application program issues write I/O and fsync requests, additional write I/O is requested according to a file system's journaling policy, and I/O preparation work to process each write I/O request synchronously occurs. Upon using an ultra-low latency SSD, the time it takes to perform these operations is longer than the actual I/O data transfer time. This is because the processing time for input and output inside the ultra-high-performance SSD is very short, which is less than the overhead occupied by the operating system.

Therefore, it is desirable to greatly reduce a delay of multiple end-to-end writing input and output by overlapping these operations with the storage device input and output processing time.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a method of processing input and output in an operating system includes: performing an I/O preparation process and an I/O request for a data block in an application program thread; activating, by the application program thread, a journaling thread; waiting for completion of an I/O for the data block and waiting for a commit of the journaling thread; preparing an I/O for the journal block and requesting the I/O for the journal block at a same time as the waiting for the completion of the I/O for the data block and the waiting for the commit of the journaling thread, in the journaling thread; preparing an I/O for a journal commit block, before waiting for completion of the I/O for the journal block after the requesting of the I/O for the journal block; after waiting for the completion of the I/O for the journal block, requesting the I/O for the journal commit block; and waiting for completion of the I/O for the journal commit block.

The preparing of the I/O for the journal block and the preparing of the I/O for the journal commit block may include any one of an allocation of a journal area, an allocation of a buffer page, an allocation and manipulation of a block I/O-related data structure, and a request of a block layer until an I/O dispatch.

In the preparing of the I/O for the journal block and the preparing of the I/O for the journal commit block, a device input and output operation of the data block, and a device input and output operation of the journal block may overlap each other.

The journaling thread may be operated before the I/O of the data block is completed so that the I/O preparation for the journal block overlaps the I/O for the data block.

The journaling thread may start preparing to write the journal block while the I/O of the data block occurs.

The journaling thread may prepare to write the journal block and then start preparing the I/O for the journal commit block.

The journaling thread may not issue the I/O for the journal commit block to the journal commit block immediately after the preparing of the I/O for the journal commit block is completed, and journal commit block writing may be transferred after a flush is completed by using a flush command after waiting for completion of journal block writing, to maintain a sequence of writing to a storage medium.

In another general aspect, a non-transitory computer-readable storage medium stores instructions that, when executed by a processor, cause the processor to perform the method described above.

In another general aspect, a computing system includes one or more processors configured to: perform an I/O preparation process and an I/O request for a data block in an application program thread; activate, using the application program thread, a journaling thread; wait for completion of an I/O for the data block and wait for a commit of the journaling thread; prepare an I/O for the journal block and request the I/O for the journal block at a same time as the waiting for the completion of the I/O for the data block and the waiting for the commit of the journaling thread, in the journaling thread; prepare an I/O for a journal commit block, before waiting for completion of the I/O for the journal block after the requesting of the I/O for the journal block; after waiting for the completion of the I/O for the journal block, request the I/O for the journal commit block; and wait for completion of the I/O for the journal commit block.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
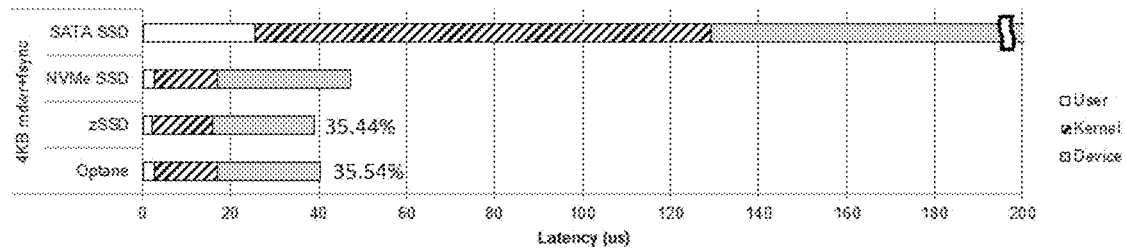
FIG. 1 is a diagram illustrating detailed time analysis for each state for 4 KB random write+fsync work in various SSDs.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless indicated otherwise, it is to be understood that all the terms used in the specification including technical and scientific terms have the same meaning as those that are generally understood by those who skilled in the art. Terms generally used and defined by a dictionary should be interpreted as having the same meanings as meanings within a context of the related art and should not be interpreted as having ideal or excessively formal meanings unless being clearly defined otherwise in this disclosure.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

Hereinafter, a method for improving a processing speed of input and output of a plurality of writing for guaranteeing a sequence of writing in an operating system will be described with reference to the accompanying drawings.

Storage performance is important in a computer system because data needs to be constantly supplied to a CPU to stop a pipeline. Storage devices are much slower than CPUs, and have had a huge gap in performance over decades.

However, the recent introduction of modern storage devices has rapidly narrowed the performance gap between storage devices and CPUs. For example, state-of-the-art non-volatile memory express (NVMe) SSDs, such as the latest Samsung Z-SSD, Intel Optane SSD, and Toshiba XLFlash, have I/O latency of less than 10 microseconds and an I/O bandwidth of 3.0 GB/s, and thus are much faster than conventional disk storage devices.

When using such an ultra-low latency SSD, a kernel I/O stack is no longer a negligible part of the I/O latency.

FIG. 1 is a graph of I/O latency and CPU utilization in a 4 KB random write+fsync workload (implemented with a synchronous flexible I/O (FIO) engine) in various SSDs.

As illustrated in FIG. 1, it can be seen that faster devices exhibit lower I/O latency. However, a time consumed by an OS kernel increases by up to 35% for full write workloads. Due to the contracted device I/O time, an absolute time consumed by the OS kernel is similar between different storage devices, but a relative portion of the kernel increases. According to Amdahl's Law, the kernel I/O stack needs to be optimized considerably.

The I/O stack is constituted by several layers. In the I/O stack, a virtual file system (VFS) layer provides an abstraction of a basic file system. A page cache layer provides caching of file data. A file system layer provides file system-specific implementations for block repository. A block layer provides OS level block request/response management and block I/O scheduling. Finally, a device driver processes device-specific I/O submission and I/O completion.

In this disclosure, a write (+fsync) I/O path sensitive to latency in an Ext4 file system with a Linux kernel and an NVMe-based SSD is targeted, because such a configuration is a widely adopted system configuration from mobile to enterprise.

Figure 2:
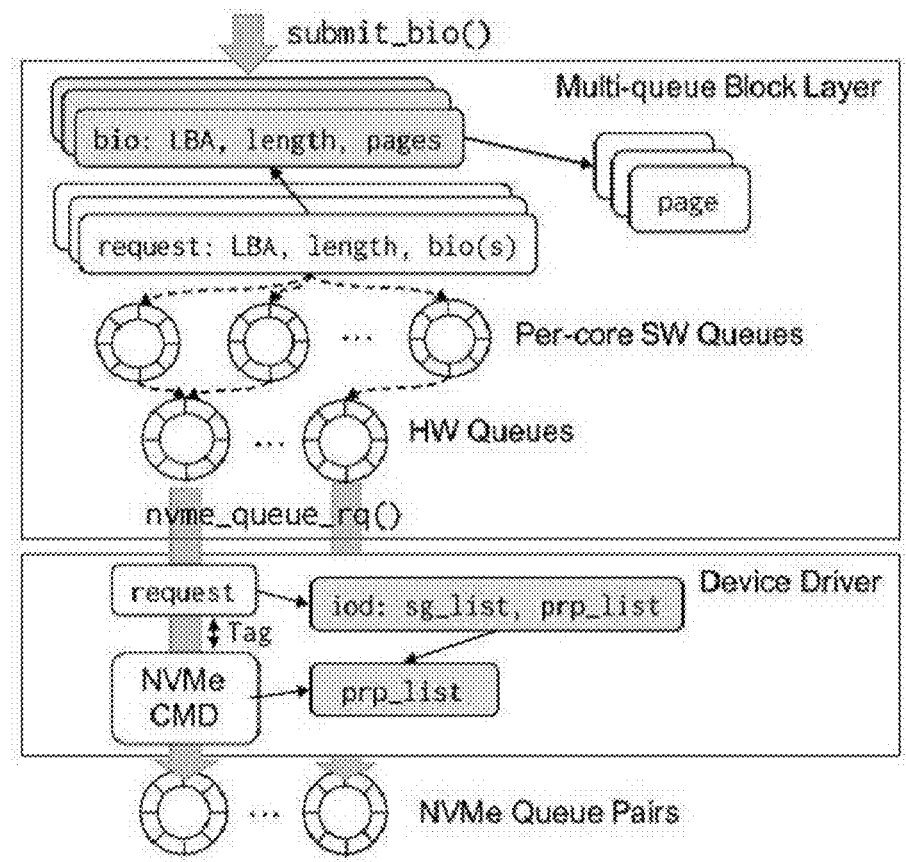
FIG. 2 is a diagram illustrating an overview of a multi-queue block layer of Linux, which is a basic block layer of NVMe SSD.

FIG. 2 illustrates an overview of a multi-queue block layer of Linux, which is a basic block layer of NVMe SSD. In the process of allocating the bio structure used in the block layer, a block request (bio) including LBA, an I/O length, and a page to be copied is generated. Thereafter, when the bio structure is transferred to the block layer, the bio structure is converted into a request structure related to bio and waits in the request queue.

In the state in which the block is plugged, the request is inserted into the request queue, until the block is unplugged.

Request merging and request scheduling are performed in the request queue. The block layer maintains and manages two queues: a software queue per core for multi-core scalability, and a hardware queue for each device-side queue.

When the request is transferred to the device driver, iod, which is a structure related to DMA mapping having a distribution/collection list, is allocated, and DMA mapping is performed on the page of the dispatched request. In the next step, prp_list, which is a list including a physical area page of an NVMe protocol, is allocated and filled with a target DMA address.

Finally, an NVMe command is issued to an NVMe submission queue. When the I/O is completed later, an interrupt processor unmaps a DMA address of the page and the page is unlocked, thereby calling a function to wake up a blocked thread.

fsync is a function that has the greatest impact on application performance in a write path. The read I/O issued by the fsync is related to a buffered read in the page cache.

However, the buffered read path does not perform the device I/O operation, so there is no chance of overlapping I/O and computation.

On the other hand, the fsync may involve multiple device I/O operations due to the file system conflict consistency mechanism (i.e., file system journaling).

Figure 3A:
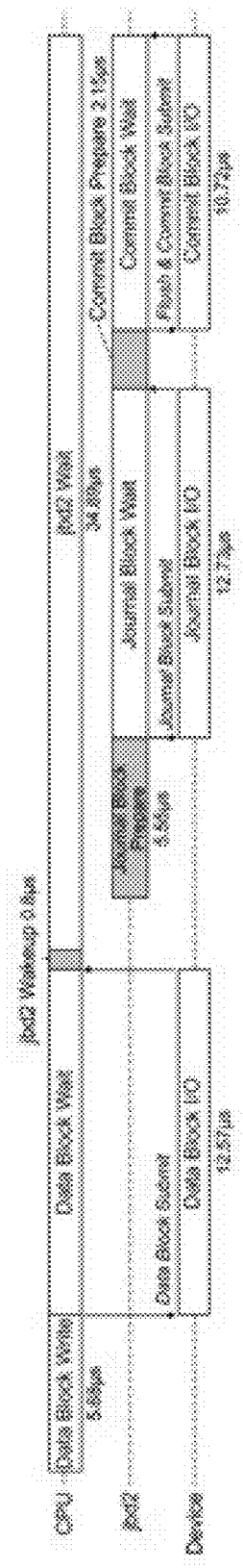
FIG. 3A is a diagram illustrating a general operation of a fsync system call using file system journaling.

FIG. 3A illustrates a general operation of a fsync system call using file system journaling in an Ext4 file system that performs journaling in an ordered mode.

First, the application program thread writes a dirty data page and waits for the completion of the input/output of the corresponding page. Then, the application program thread activates a journaling thread (Ext4's JBD2) to commit file system transactions.

Then, a journaling thread JBD2 writes metadata changes (journal blocks in the drawing) in the journaling area, waits for completion, and finally writes a commit block.

The flush command is applied between the writing of the journal block and the writing of the commit block to guarantee the write order inside the storage device. Therefore, a writing operation of a total of three devices is performed on the single fsync system call. Therefore, the fsync related to the fsync path and the I/O device operation related to the computational part may overlap each other.

Figure 3B:
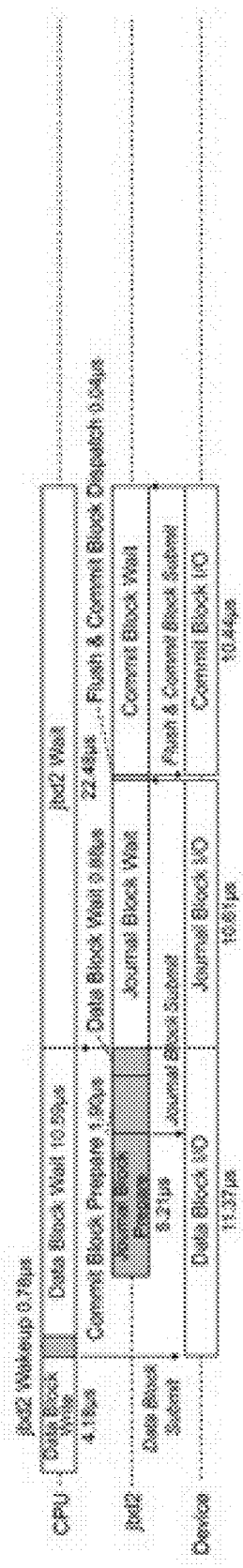
FIG. 3B illustrates an operation of the fsync system call, according to an embodiment.

As illustrated in FIG. 3B, a preparation operation (for example, an operation of any one of an allocation of a journal area, an allocation of a buffer page, an allocation and manipulation of a data structure-related block I/O, and a request of a block layer until an I/O dispatch) of the journal block and commit block may overlap the data block input and output operations and the journal block device input and output operation, respectively. This effectively reduces the time required to prepare the corresponding block, thereby reducing the number of critical paths of the fsync system call.

As described above, the fsync system call involves multiple I/O operations. In the disclosure herein, the journal block writing and the commit block writing are prepared at the data block input and output time or the commit block writing is prepared at the journal block input and output time, so the I/O process which is being performed currently and the I/O preparation process time to occur later overlap each other.

Also, there is no dependency between the data block I/O operation and the journal block preparation or between the journal block I/O and the commit block preparation. For this reason, the overlapping of the I/O operation and the subsequent I/O preparation operation is completely safe and does not affect the conflict consistency of the file system. To this end, the fsync path is changed as illustrated in FIG. 3B.

In order to overlap the journal block preparation with the data block I/O, the journaling thread operates before the data block I/O is completed. Then, while the data block I/O is taking place, the journaling thread starts preparing to write the journal block.

Immediately after preparing the journal block, the journaling thread starts preparing the commit block. The journaling thread does not immediately issue the commit block I/O immediately after the commit block preparation is completed. Instead, the flush command is used to maintain the sequence of writing to the storage medium, the flush command is called after the data block and journal block I/O is completed, and the commit block writing is transferred after the flush is completed.

The method disclosed herein is implemented in Linux kernel version 5.0.5. In the disclosed implementation method, a new file open flag is used to selectively use the proposed I/O stack.

The implementation method disclosed herein supports an improved fsync system call. A background writing thread uses the write path proposed in herein when there is a specific flag that is added in the inode. The file access without flags passes through the existing kernel I/O stack.

An experiment was conducted using a Dell R730 Server equipped with an Intel Xeon E5-2640 CPU and a 32 GB DDR4 memory. For the ultra-low latency storage devices, both the Samsung Z-SSD and the Intel Optane SSD were evaluated. The disclosed method was implemented in Linux kernel version 5.0.5. Table 1 summarizes the experimental setup.

TABLE 1

| Server | | Dell R730 |
|---|---|---|
| OS | | Ubuntu 16.04.4 |
| Base kernel | | Linux 5.0.5 |
| CPU | Intel Xeon | E5-2640v3 2.6 GHz 8 cores |
| Memory | | DDR4 32 GB |
| Storage Devices | Z-SSD | Samsung SZ985 800 GB |
| | Optane SSD | Intel Optane 905P 960 GB |
| | NVMe SSD | Samsung PM1725 1.6 TB |
| | SATA SSD | Samsung 860 Pro 512 GB |

Both a synthetic micro-benchmark and an real-world workload were used for evaluation.

The synthetic micro-benchmark used FIOs that may generate various I/O patterns using various parameters (for example, I/O request size, read portion, the number of threads, and the like).

In the case of the real-world workload, the disclosed method used various application programs such as a database application program (RocksDB DBbench), a file system benchmark (Filebench-varmail), and an OLTP workload (Sysbench OLTP-insert) running on MySQL.

In particular, in the method disclosed herein, the fillsync operation of the RocksDB DBbench was executed, and the fsync-intensive case (the use of use fsync flag) is shown. Both the Filebench-varmail and the Sysbench OLTP-insert are workloads that frequently use fsync.

Figure 4A:
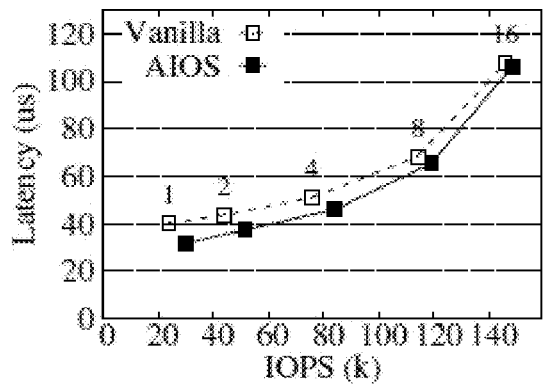
FIGS. 4A to 4D are diagrams illustrating a performance impact of an asynchronous I/O stack (AIOS), according to an embodiment, on a flexible I/O (FIO) fsync-based 4 KB random write workload.
Figure 4B:
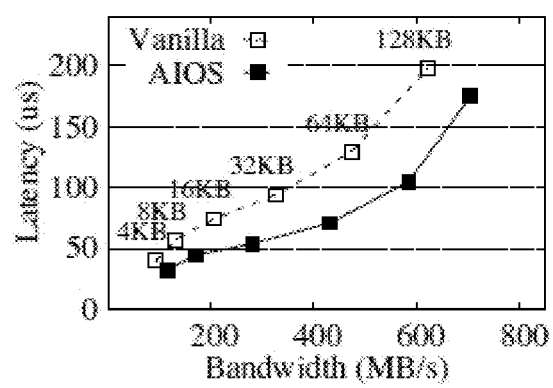
Figure 4C:
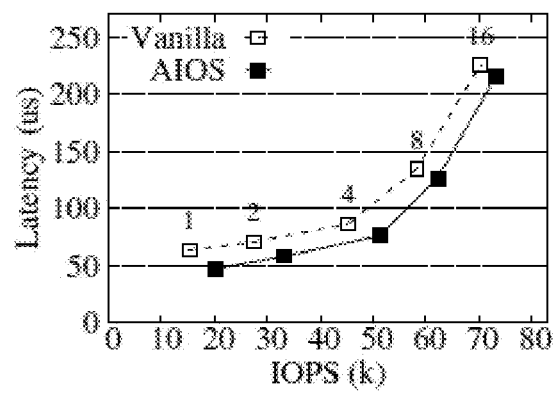
Figure 4D:
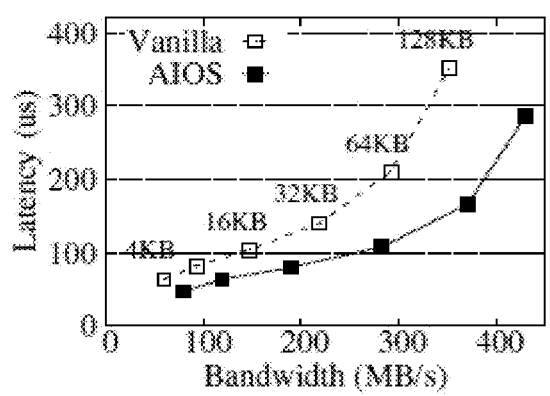

FIGS. 4A to 4D illustrate the effect of performance (Vanilla) in the existing kernel for the FIO 4 KB random write (followed by fsync) and the performance (AIOS) in the kernel according to the disclosure herein. Here, two journaling modes are evaluated: ordered journaling mode (i.e., perform only the writing of the journal metadata and ordered data) and data journaling mode (i.e., perform the journaling on both the journal metadata and data). In particular, FIGS. 4A and 4B illustrate performance ordered journaling mode, and FIGS. 4C and 4D illustrate performance in data journaling mode. Also, for each journaling mode, FIGS. 4A to 4D show the performance as the number of threads increases and the block size increases.

FIGS. 4A and 4C show maximum performance improvement in the single-threaded experimental setup (27% and 34% IOPS increase in the ordered journaling mode and the data journaling mode, respectively). In a multi-threaded experimental setup, the more threads that are competing with each other, the less likely it is that the journaling time in the method disclosed herein will overlap. Accordingly, FIGS. 4A and 4C illustrate that the range of performance improvement provided by the method disclosed herein decreased as the number of threads increased.

In the data journaling mode (FIGS. 4C and 4D), the latency of the overlapping portion was larger than that of the ordered journaling mode (FIGS. 4A and 4B), so the latency advantage of the method disclosed herein in the data journaling mode was slightly larger than the latency advantage of the method disclosed herein ordered journaling mode.

As can be seen in FIGS. 4B and 4D, the benefits of the overlapping I/O device operation and the CPU operation in the disclosed method increased as the block size increased.

Figure 5:
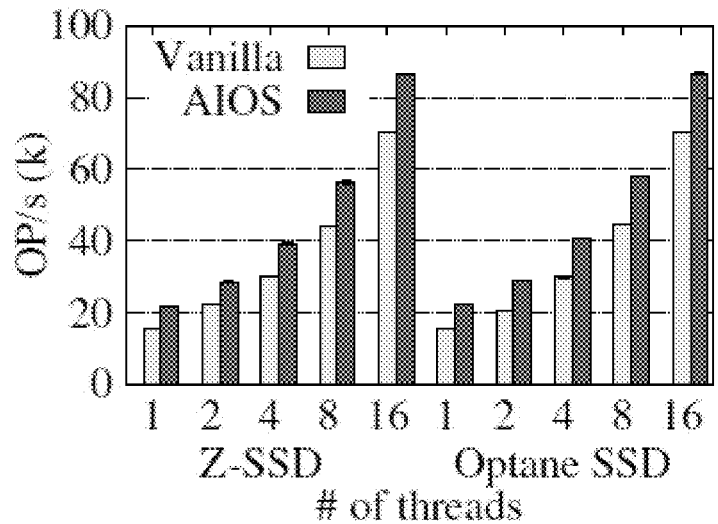
FIG. 5 is a graph of random write performance results of DBbench in RocksDB.

FIG. 5 illustrates fillsync performance results in RocksDB DBbench. (16 GB data set, 16 byte key and 1000 byte value)

The AIOS of this disclosure shows a noticeable performance improvement in workload per second (up to 44%) measurement result.

Figure 6:
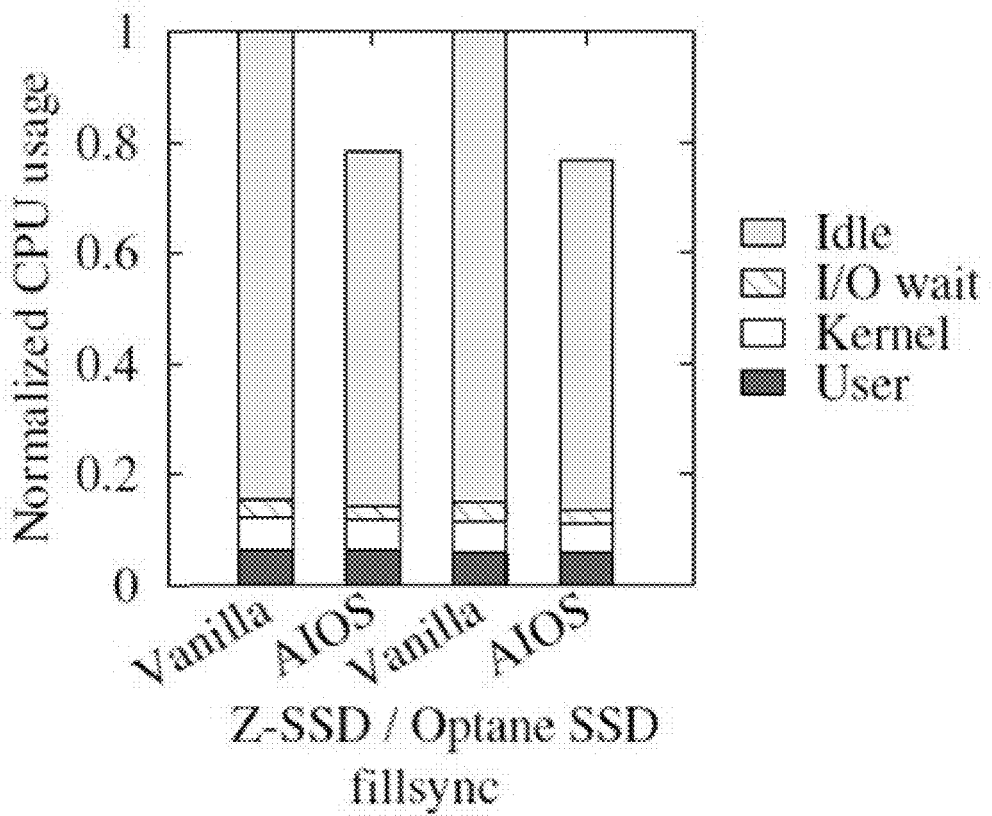
FIG. 6 is a graph illustrating a standardized CPU runtime analysis for each workload.

FIG. 6 shows a standardized CPU runtime analysis for a workload for each storage device in eight thread configurations of the experiment of FIG. 5.

Overall, the AIOS significantly reduced the CPU time (I/O wait) consumed to wait for I/O, while significantly reducing the CPU time for waiting for the journaling thread to complete the commit (Idle). This shows that the AIOS effectively overlapped kernel work and I/O work.

In addition, by providing improved write I/O operations, the AIOS reduced overall runtime. The trend was similar for the Z-SSD and the Optane SSD.

Figure 7A:
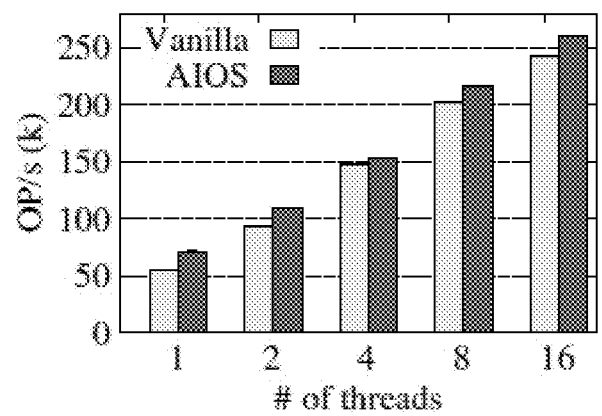
FIGS. 7A and 7B illustrate Filebench-varmail (basic configuration) workload performance in various thread count experimental setups implemented using a Z-SSD and an Optane SSD, respectively.
Figure 7B:
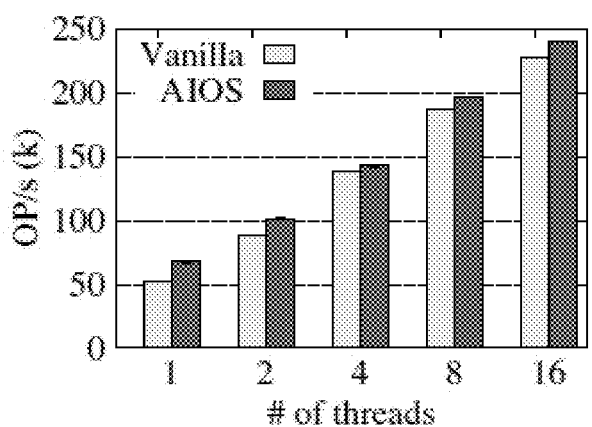
Figure 8A:
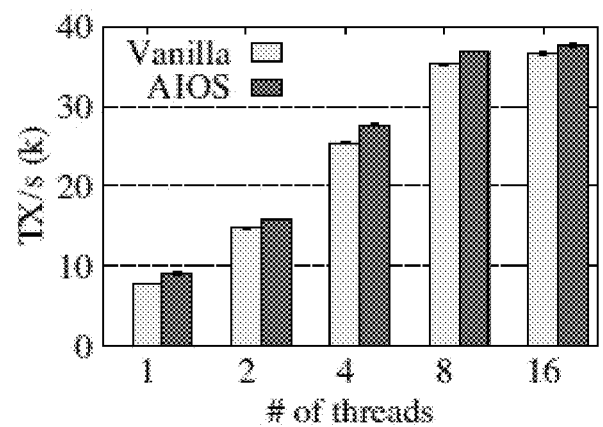
FIGS. 8A and 8B illustrate Sysbench-OLTP-insert (10 GB DB table size) workload performance in various thread count experimental setups implemented using the Z-SSD and the Optane SSD, respectively.
Figure 8B:
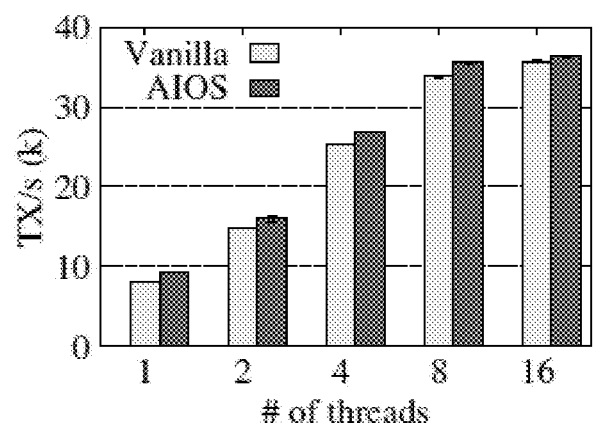

FIGS. 7A and 7B illustrate Filebench-varmail (basic configuration) workload performance in various thread count experimental setups implemented using the Z-SSD and the Optane SSD, respectively. FIGS. 8A and 8B illustrate Sysbench-OLTP-insert (10 GB DB table size) workload performance in various thread count experimental setups implemented using the Z-SSD and the Optane SSD, respectively.

Referring to FIGS. 7A and 7B, using the AIOS disclosed herein in the Filebench-varmail's single-threaded experiment, it was possible to obtain 30% and 29% more throughputs on the Z-SSD and the Optane SSD, respectively.

Similarly, in the single-threaded case of the Sysbench-OLTP-insert, the AIOS disclosed herein achieved a performance improvement of 15% and 16% on the Z-SSD and the Optane SSD, respectively. In general, when the number of threads was large (8 or more), the I/O operations and CPU computations naturally overlapped due to multi-threading, so the advantage of the method disclosed herein decreased.

Figure 9:
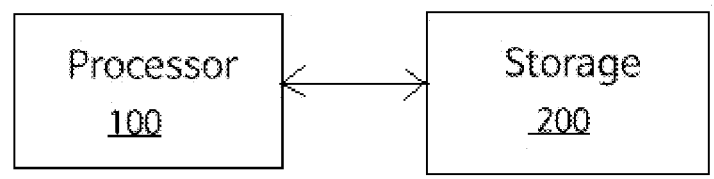
FIG. 9 illustrated a computing device configured to implement and AIOS stack, according to an embodiment.

FIG. 9 illustrates a computing system 10, according to an embodiment.

Referring to FIG. 9, the computing system 10 may include a processor 100 and a storage device 200 in communication with the processor 100. The storage 200 may be, for example, an SSD.

The processor 100 may be configured to write data to and read data from the storage 200. The processor 100 may implement the AIOS described herein to perform I/O operations with respect to the storage 200.

The processor 100, the storage 200, the processors, the storages, and the memories in FIGS. 1 to 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing input and output in an operating system, the method comprising:
    performing an I/O preparation process and an I/O request for a data block in an application program thread;
    activating, by the application program thread, a journaling thread;
    preparing, by the journaling thread, an I/O for a journal block;
    simultaneously waiting for, by the application program thread, completion of an I/O for the data block, waiting for, by the application program thread, a commit of the journaling thread, and requesting, by the journaling thread, the I/O for the journal block;
    preparing, by the journaling thread, an I/O for a journal commit block, before waiting for completion of the I/O for the journal block after the requesting of the I/O for the journal block;
    after waiting for the completion of the I/O for the journal block, requesting, by the journaling thread, the I/O for the journal commit block; and
    waiting for, by the journaling thread, completion of the I/O for the journal commit block,
    wherein the preparing of the I/O for the journal block and the preparing of the I/O for the journal commit block comprise any one of an allocation of a journal area, an allocation of a buffer page, an allocation and manipulation of a block I/O-related data structure, and a request of a block layer until an I/O dispatch, and
    wherein, in the preparing of the I/O for the journal block and the preparing of the I/O for the journal commit block, a device input and output operation of the data block, and a device input and output operation of the journal block overlap each other.

2. The method of claim 1, wherein the journaling thread is operated before the I/O of the data block is completed so that the I/O preparation for the journal block overlaps the I/O for the data block.

3. The method of claim 2, wherein the journaling thread starts preparing to write the journal block while the I/O of the data block occurs.

4. The method of claim 2, wherein the journaling thread prepares to write the journal block and then starts preparing the I/O for the journal commit block.

5. The method of claim 4, wherein the journaling thread does not issue the I/O for the journal commit block to the journal commit block immediately after the preparing of the I/O for the journal commit block is completed, and journal commit block writing is transferred after a flush is completed by using a flush command after waiting for completion of journal block writing, to maintain a sequence of writing to a storage medium.

6. A non-transitory computer-readable storage medium storing instructions that, when executed by a processor, cause the processor to perform the method of claim 1.

7. A computing system, comprising:
    one or more processors configured to:
    perform an I/O preparation process and an I/O request for a data block in an application program thread;
    activate, using the application program thread, a journaling thread;
    prepare, using the journaling thread, an I/O for a journal block;
    simultaneously wait for, using the application program thread, completion of an I/O for the data block, using the application program thread, wait for a commit of the journaling thread, and request, using the journaling thread, the I/O for the journal block;
    prepare, using the journaling thread, an I/O for a journal commit block, before waiting for completion of the I/O for the journal block after the requesting of the I/O for the journal block;
    after waiting for the completion of the I/O for the journal block, request, using the journaling thread, the I/O for the journal commit block; and
    wait for, using the journaling thread, completion of the I/O for the journal commit block,
    wherein the preparing of the I/O for the journal block and the preparing of the I/O for the journal commit block comprise any one of an allocation of a journal area, an allocation of a buffer page, an allocation and manipulation of a block I/O-related data structure, and a request of a block layer until an I/O dispatch, and
    wherein, in the preparing of the I/O for the journal block and the preparing of the I/O for the journal commit block, a device input and output operation of the data block, and a device input and output operation of the journal block overlap each other.

* * * * *